United States Patent
Kurien et al.

(10) Patent No.: US 9,166,797 B2
(45) Date of Patent: Oct. 20, 2015

(54) SECURED COMPARTMENT FOR TRANSACTIONS

(75) Inventors: Thekkthalackal Varugis Kurien, Sammamish, WA (US); Cormac E. Herley, Bellevue, WA (US); Alice Jane Bernheim Brush, Bellvue, WA (US); Daniel C. Robbins, Seattle, WA (US); Arindam Chatterjee, Seattle, WA (US); Scott Field, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1370 days.

(21) Appl. No.: 12/257,765

(22) Filed: Oct. 24, 2008

(65) Prior Publication Data

US 2010/0107218 A1   Apr. 29, 2010

(51) Int. Cl.
*H04L 9/32* (2006.01)
*G06F 13/24* (2006.01)
*G07F 7/08* (2006.01)
*G07F 7/10* (2006.01)

(52) U.S. Cl.
CPC .............. *H04L 9/3263* (2013.01); *G06F 13/24* (2013.01); *G07F 7/0826* (2013.01); *G07F 7/1008* (2013.01); *G06F 2221/2149* (2013.01); *H04L 2209/56* (2013.01)

(58) Field of Classification Search
CPC .. G06F 21/52; G06F 2221/2149; G06F 13/24
USPC ............................................................. 726/2
See application file for complete search history.

(56) References Cited

U.S. PATENT DOCUMENTS

| | | | | |
|---|---|---|---|---|
| 4,918,653 | A | * | 4/1990 | Johri et al. ...................... 726/23 |
| 4,926,476 | A | * | 5/1990 | Covey ............................ 711/163 |
| 6,658,573 | B1 | * | 12/2003 | Bischof et al. .................. 726/16 |
| 7,103,914 | B2 | * | 9/2006 | Focke et al. ..................... 726/22 |
| 7,149,832 | B2 | * | 12/2006 | Wieland et al. ............... 710/269 |
| 7,249,211 | B2 | * | 7/2007 | Wieland et al. ............... 710/269 |
| 7,302,698 | B1 | * | 11/2007 | Proudler et al. .................. 726/2 |
| 7,401,230 | B2 | * | 7/2008 | Campbell et al. ............. 713/190 |
| 7,530,103 | B2 | * | 5/2009 | Willman et al. ................ 726/21 |

(Continued)

FOREIGN PATENT DOCUMENTS

WO    WO2008027564 A2    3/2008

OTHER PUBLICATIONS

An Open Trusted Computing Architecture—Secure Virtual Machines Enabling User-Defined Policy Enforcement; Dirk Kuhlmann et al.; Aug. 21, 2006.*

(Continued)

*Primary Examiner* — James Turchen
(74) *Attorney, Agent, or Firm* — Julie Kane Akhter; Danielle Johnston Holmes; Micky Minhas

(57) ABSTRACT

Systems and methods that establish a secured compartment that manages sensitive user transactions/information on a user's machine. The secured compartment qualifies user interaction with the machine, and separates such qualified interaction from other user activity on the machine. A user is switched to such secured compartment upon occurrence of a predetermined event, such as in form of: an explicit request (e.g., a secure attention sequence); an implicit request (e.g., inference of user activities); and presence of a peripheral device that is bound to the secured compartment (e.g., a USB)—wherein such actions typically cannot be generated by an application running outside the secured compartment.

19 Claims, 10 Drawing Sheets

(56) References Cited

U.S. PATENT DOCUMENTS

| | | | |
|---|---|---|---|
| 7,613,930 B2* | 11/2009 | Dotan | 713/188 |
| 7,673,332 B2* | 3/2010 | Mardikar et al. | 726/9 |
| 7,756,987 B2* | 7/2010 | Wang et al. | 709/229 |
| 7,849,310 B2* | 12/2010 | Watt et al. | 713/164 |
| 8,015,606 B1* | 9/2011 | Jevans et al. | 726/22 |
| 8,024,568 B2* | 9/2011 | Rao et al. | 713/168 |
| 8,024,790 B2* | 9/2011 | Zhao et al. | 726/17 |
| 8,117,642 B2* | 2/2012 | Covey et al. | 726/2 |
| 8,151,343 B1* | 4/2012 | Wang et al. | 726/19 |
| 8,176,430 B1* | 5/2012 | Cahill | 715/760 |
| 8,285,987 B1* | 10/2012 | Kimball et al. | 713/164 |
| 8,302,169 B1* | 10/2012 | Presotto et al. | 726/5 |
| 8,365,266 B2* | 1/2013 | Bogner | 726/8 |
| 8,613,091 B1* | 12/2013 | Vaidya et al. | 726/24 |
| 2002/0166062 A1* | 11/2002 | Helbig, Sr. | 713/200 |
| 2003/0041255 A1* | 2/2003 | Chen et al. | 713/193 |
| 2004/0088562 A1* | 5/2004 | Vassilev et al. | 713/200 |
| 2004/0128544 A1* | 7/2004 | Hondo et al. | 713/201 |
| 2005/0033980 A1* | 2/2005 | Willman et al. | 713/200 |
| 2005/0144437 A1* | 6/2005 | Ransom et al. | 713/151 |
| 2006/0031940 A1* | 2/2006 | Rozman et al. | 726/27 |
| 2006/0190606 A1 | 8/2006 | Kohavi | |
| 2006/0235795 A1 | 10/2006 | Johnson et al. | |
| 2007/0101435 A1 | 5/2007 | Konanka et al. | |
| 2007/0192826 A1* | 8/2007 | Frank et al. | 726/1 |
| 2007/0250927 A1* | 10/2007 | Naik et al. | 726/22 |
| 2008/0016005 A1* | 1/2008 | Owen et al. | 705/73 |
| 2008/0256536 A1* | 10/2008 | Zhao et al. | 718/1 |
| 2009/0064321 A1* | 3/2009 | Dick et al. | 726/21 |
| 2009/0083532 A1* | 3/2009 | Brannock et al. | 713/1 |
| 2010/0031360 A1* | 2/2010 | Seshadri et al. | 726/24 |

OTHER PUBLICATIONS

SecVisor: A Tiny Hypervisor to Provide Lifetime Kernel Code Integrity for Commodity OSes; Arvind Seshadri et al.; SOSP'07; Oct. 14-17, 2007.*

Trusted Enterprise Security: How the Trusted Computing Group (TCG) Will Advance Enterprise Security; Jon Oltsik; Jan. 2006.*

Internet Explorer 7 Protected Mode http://whitepapers.techrepublic.com.com/abstract.aspx?docid=270456. Last accessed Jun. 6, 2008, 3 pages.

Transaction Guard http://www.trendsecure.com/portal/en-US/tools/security_tools/transaction_guard. Last accessed Jun. 6, 2008, 1 page.

Eodore Goldstein, et al., The Gateway Security Model in the Java Electronic Commerce Framework http://cse.stanford.edu/class/cs506/GatewaySV7.PDF. Last accessed Jun. 6, 2008, 15 pages.

Software Security Metrics for Malware Resilience http://hss.ulb.uni-bonn.de/diss_online/math_nat_fak/2008/langweg_hanno/1332.pdf. Last accessed Jun. 6, 2008, 253 pages.

Paul England, et al., Virtual Machines for Enterprise Desktop Security http://www.sciencedirect.com/science?_ob=MImg&_imagekey=B6VJC-4MH44W4-6-H&_cdi=6091&_user=10&_orig=search&_coverDate=12%2F31%2F2006&_sk=999889995&view=c&wchp=dGLzVlz-zSkzk&md5=dffde598d8edf3f92dbd931aac900960&ie=/sdarticle.pdf. Last accessed Jun. 6, 2008, 10 pages.

* cited by examiner

SECURED COMPARTMENT FOR TRANSACTIONS

BACKGROUND

Developments in communication technology have changed common protocol for business, hence reducing in-person communication as people communicate through alternative mediums. For example, e-mail enables individuals to communicate virtually instantaneously over the Internet. Moreover, as the Internet grows in popularity as a business medium, users engage in a wider variety of transactions online. Accordingly, various transactions such as interactions with financial institutions or online retailers, now involves sensitive exchange of personal information (e.g., bank account numbers or credit card information.) To protect such information, a plurality of solutions have been introduced that typically require users to register and obtain unique user name/password prior to the business transaction.

Moreover, in such systems security breaches such as spoofing attacks are becoming pervasive. In general, user spoofing attacks relate to attempts by malicious third parties to deceive users into disclosing username/password or other type of credential specified by user (e.g., memorized), through impersonation of trusted entities. Generally, spoofing attacks can be initiated by local malware or by sending electronic mail messages, which are crafted such that they appear to originate from known and trusted establishments. Such electronic mail messages typically inform recipients that the trusted entity needs to verify user information by having to check username/password. The user may enter such information at a web site that appears to belong to such trusted entity, and yet is controlled by malicious third parties. Once a user enters such information at a phishing site, the third party can use such user held credential (e.g., username and password) at the real website being impersonated, to perform transactions or even to wrest control of an account away from the user.

Several factors make spoofing a challenging problem from a computer security standpoint. First, in spoofing attacks the victim unknowingly or unwittingly assists the attacker by voluntarily providing security credentials such as a username and password. Second, identifying phishing sites can be difficult using a fixed algorithm because attackers both quickly adapt to security measures; and hence it is difficult if not impossible to anticipate the ingenuity of all future attackers with a fixed set of rules. Third, users tend to ignore warnings about security dangers—a user who does not heed the warning can render even the best warnings useless.

Other type of security breaches occur when users cannot readily ensure that their PCs are free of malware and spyware. Even if every effort is made to keep a system fully patched (e.g., running anti-virus program and implementing firewall policies), a malicious code may still end up on the system. Such can be of great concern for users who perform financial tasks such as banking and shopping on a PC. For example, a key logger installed on a machine can spy on all keyboard traffic, retrieve passwords for any accounts accessed and then compromise the accounts.

Furthermore, since users often perform a plurality of tasks and a variety of activities on the same machine—it is often difficult to guarantee the safety for such machine. For example, if a machine is used only for banking, and never accesses sites other than predetermined financial entities, a high chance exists for keeping such machine relatively clean. Nonetheless, if such user also plays online games; visits web sites that maintain poor security policies, or installs shareware applications, the threat risk is substantially increased. As such, it is exceedingly difficult to ensure that such machine is free of malware or spyware. Hence, users continue to face challenges when desiring to perform secure tasks, such as financial transactions or banking, on the same machine where malicious applications can run in the same security context as the rest of the users programs and data.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation designates a secured compartment that manages sensitive user transactions/information on a user's machine, wherein such secured compartment restricts interaction of the user with the machine, and further separates such qualified interaction from other user activity. In one aspect, a user is switched to the secured compartment upon occurrence of a predetermined event (e.g., in form of an interrupt). Such interrupt can relate to an explicit request (e.g., a secure attention sequence); an implicit request (e.g., inference of user activities); or detection of a peripheral device that is bound to the secured compartment (e.g., a USB). In another aspect, the generated interrupt that results in switching cannot be generated by an application running outside the secured compartment. Since entry into the secured compartment typically requires an action that cannot be generated by an application running outside the system Trusted Computing Base (TCB), the user is thus protected from entering an unsafe compartment created by a malicious entity and being spoofed thereby. Accordingly, as long as the trusted mechanism is employed to switch into the compartment, the user cannot be spoofed.

In a related aspect, the secured compartment can include data that is personalized for, or by the user, to mitigate a risk of such user being presented with fake alternatives. Examples of such data can include: a history of the users actions inside the compartment in form of favorites, messages including email that the user has received inside the compartment or applications that the user has installed inside the compartment.

Moreover, a user's experience within the secured compartment can be separated from outside such compartment, wherein "whitelisted" entities (e.g., known safe) are presented within the secured compartment. If the user exits such secured compartment, then access to non-whitelisted entities such as URIs and programs are enabled and access to whitelisted entities (such as URIs, programs). Typically, all channels into and out of the secured compartment are guarded, and the secured compartment provides an isolated environment to interact with whitelisted entities. (An "entity" can refer to any active item that a user is capable of interacting with, including but not limited to URIs, programs and data that the user can receive on a channel into the compartment.)

According to a further aspect, actions performed in the secured compartment are typically not viewed by applications that are running outside the secured compartment. For example, it can be assumed that when a user is logged into the PC, such user is generally deemed a "standard user" rather than an "administrator"—wherein such standard user is not positioned in the portion of the computer Trusted Computing Base (TCB) that enforces policy separation across different subjects on the computer.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
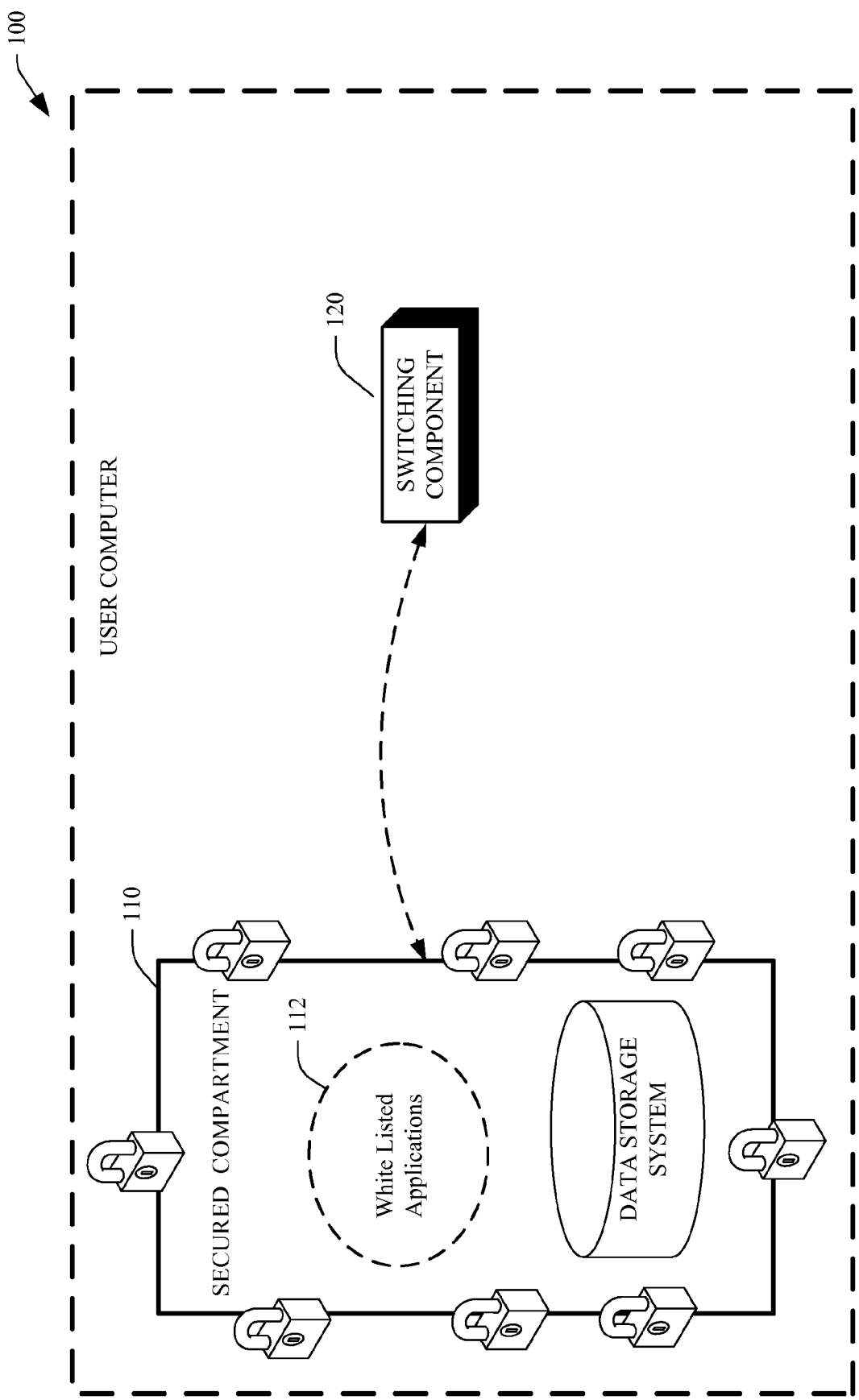
FIG. 1 illustrates a block diagram of a secured compartment and a switching component that switches a user therein, according to an aspect of the subject innovation.

FIG. 1 illustrates a system 100 that forwards a user to a secured compartment according to an exemplary aspect of the subject innovation. The secured compartment 110 includes a set of user experiences that are isolated and separate from the remainder of such experiences in the user computer 100. The computer 100 enables secure interaction acquisition, storage and/or application of credential(s) for a user (e.g., when accessing a particular resource) through a secure, isolated environment in form of the secured compartment 110. For example, the secured compartment 110 can be part of a core building block for operating system component(s) and/or application(s) that handle credential(s) in a secure manner.

In response to generation of an interrupt, the switching component 120 can prompt a user to enter the secured compartment 110. For example, a secure attention sequence—(e.g. control-alt-delete); can be entered by the user and captured at the kernel level to be handled by a trusted operating system component, e.g., via a trusted path. The use of a user secure attention sequence (e.g., a special keystroke captured in the kernel of the operating system or other interrupt that cannot be generated by an application running outside the system Trusted Computing Base (TCB))—prior to the entry of a credential—can ensure that the operating system has generated the prompt, and not a rogue application. Moreover, the switching component 120 can provide support for a generic confirmation operation on the secured compartment 110. For example, collection of a confirmation input can be required from the user (e.g., "yes/no", "ok/cancel" and/or the like), to securely call into a user interface component (not shown) to prompt the user on the secured compartment 110 (e.g., to prevent against scripting attacks).

Moreover, it can be assumed that when logged into the PC, the user is generally in "user mode" rather than "administrator mode." Thus, applications installed have certain restrictions—for example, they cannot be installed as services, and cannot overwrite OS functionality. Likewise, applications run in the context of a first user cannot generally spy on the activities of another user. For example, from a system's perspective, when entering the secured compartment 110 the user can effectively switch to a separate user account—wherein activities/applications thus left behind cannot follow. Likewise, desktop switching can be employed via desktop functionality of the operating system.

For example, the switching component 120 can switch a user to the secured compartment 110 to perform banking and money related tasks. In general, all channels into and out of the secured compartment 110 are guarded. For example, only whitelisted applications 112 that are verified to be safe can run in the secured compartment 110, and only whitelisted domains can be visited by a browser running in the secured compartment 110, as described in detail infra. As such, if a user desires to run other non-whitelisted applications or application or visit a URL that is not whitelisted, the user must exit the secured compartment 110; or will be automatically ejected. In general, actions performed in the secured compartment 110 cannot be observed by applications running outside thereof. This restricts the ability of a keylogger outside the secured compartment 110, to observe passwords and credentials entered by the user when inside the secured compartment 110. As explained earlier, only whitelisted applications 112 can be executed, and whitelisted domains can be visited by the user when inside the secured compartment 110, and hence it can be ensured that malicious applications, such as spyware, do not end up observing the users actions within the secured compartment 110. Moreover, such whitelisted applications/domains stored in the user computer 100 cannot be visited when the user is outside the secured compartment 110.

Furthermore, the secured compartment 110 can have a design that is customized according to a user's preference—wherein a user can readily determine if such environment is displayed, to further mitigate a risk for the user being presented with fake representations. Hence, a malicious application residing outside such secured compartment 110 cannot create a spoof version of the secured compartment 110. Upon occurrence of a predetermined event as described in detail supra, the switching component 120 can switch the user to the secured compartment 110—wherein the secured compartment 110 is isolated from substantially all of the user application(s) running other portions of the user computer (e.g., isolated from applications operating outside the secured compartment 110). Moreover, according to a further aspect, files can be imported to the secured compartment after a scanning thereof and verification that no threat is posed for contaminating the secured compartment. In addition, objects can be bound to the secured compartment via an authenticator generated therein (e.g., employing a secret fro mutual authentication on a USB, and the like.)

Figure 2:
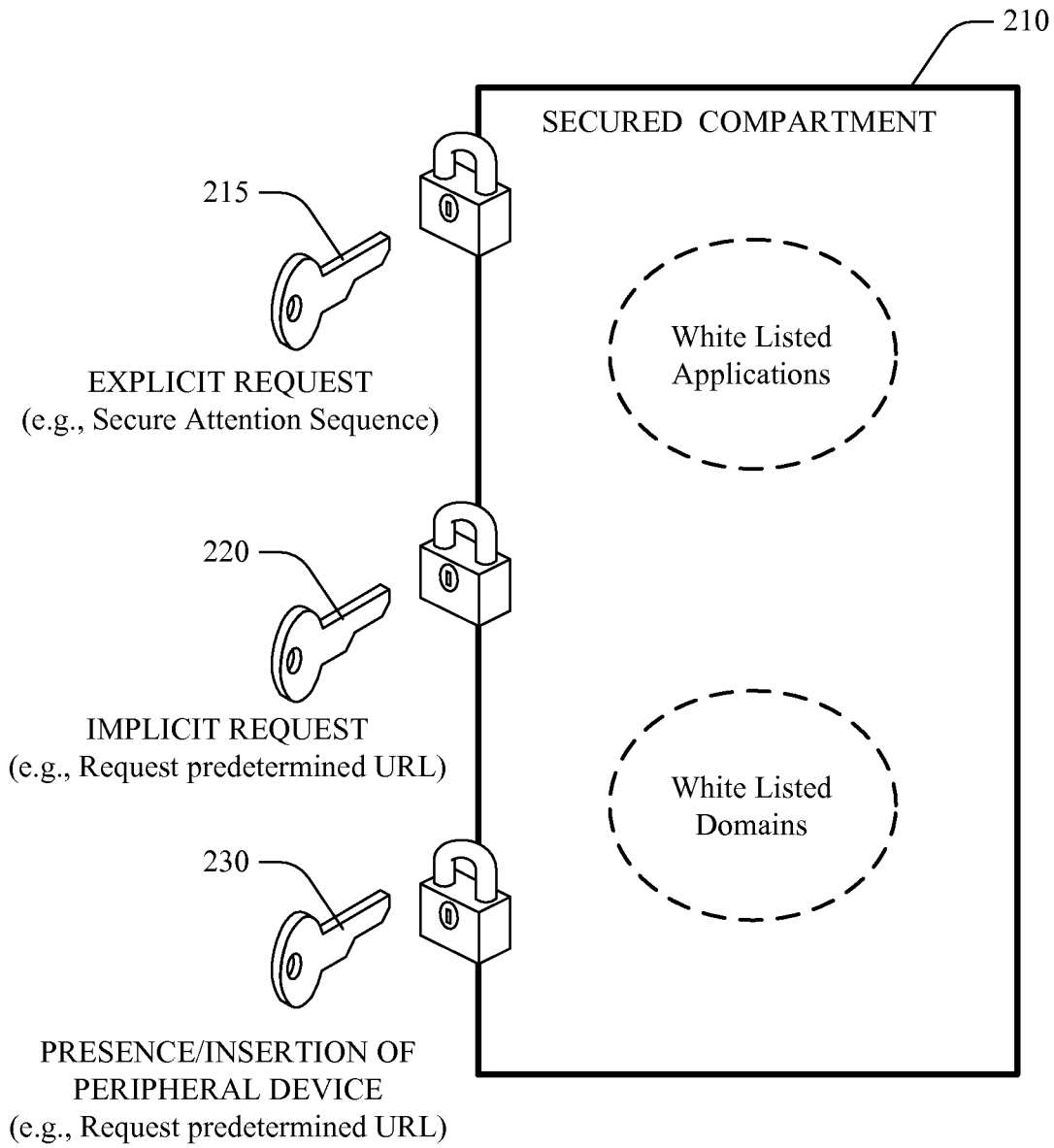
FIG. 2 illustrates exemplary methods of entry into a secured compartment according to an aspect of the subject innovation.

FIG. 2 illustrates exemplary methods of entry into the secured compartment that requires an action(s), which cannot be generated by an application running outside the secured compartment 210. As explained earlier, the secured compartment 210 represents an isolation boundary customized to host whitelisted applications. Such ensures that an application outside the secured compartment does not generate keystrokes required to enter into the secured compartment, and thereby observe any data stored and secrets entered therein.

In one aspect, a user is switched to the secured compartment 210 upon occurrence of a predetermined event. The predetermined event can be in form of an explicit request by the user 215 in form of a secure attention sequence. Such can include a special keystroke captured in the kernel of the operating system, to ensure that the operating system has generated the prompt and not a rogue application. Moreover, any action that can be construed as a Secure Attention Sequence—which typically ensures that the user is communicating with the trusted computing case (TCB)—can also be employed as a candidate for a secured compartment transition event. Likewise, entry into the secured compartment 210 can occur via an implicit request 220 by the user, such as when such user requests access to URL of a financial entity (whitelisted) that performs money transactions. For example, presence of a URL on the whitelist can itself cause either a warning to the user or a transition and/or transfer of such user to the secured compartment 210. As explained earlier, only whitelisted applications can be executed, and whitelisted domains can be visited when in the secured compartment 210. Accordingly, a request to access non-while listed applications can be refused and/or eject the user outside the secured compartment 210. For example, navigation to www.foo.com/news wherein foo is not whitelisted can cause the URL to load in a browser outside the secured compartment and cause an automatic exit of the user from the secured compartment 210.

A further predetermined event that can result in switching the user to the secured compartment 210 can include presence and/or detection 230 of a peripheral device such as a USB, which is bound to the secured compartment 210. As such, peripheral devices can be given access to the secured compartment 210 by first binding the device thereto. An example of device binding can include storing a password for entering the secured compartment 210 on the USB key, wherein such peripheral device has sufficient authority to enter the secured compartment. Other forms of device authentication can further be employed, which can typically involve proof of possession of a secret that is bound to the secured compartment itself. Likewise, devices that are not bound to the secured compartment cannot create an interrupt that transfers the user to the secured compartment.

For example, in accordance with a particular aspect of the subject innovation, the peripheral/mobile device that is paired with the secured compartment 210 can issue a self-signed access credential over a trusted connection such as a direct wired connection therebetween. The peripheral device and the computer can encrypt communications using a self-signed access credential. As such, the peripheral device and the computer each can verify the identity of the other and protect communications from eavesdroppers. According to a further aspect, the peripheral device can include an access credential module (not shown), which creates a self-signed access credential to protect data either in storage on the peripheral device or in transit to or therefrom.

As explained earlier, the attachment of the peripheral device can represent an implicit request for connection to the secured compartment. Moreover, to verify the identity of a sender of data, a device can attempt to decrypt communications from the sender using a public or private encryption key known to be assigned to a specific sender. If the communication can be decrypted properly, a high level of confidence can be attached to the determination that the communication came from the identified sender. For access to the secured compartment, a connection can be permitted only to those devices that present a proper certificate in response to an authentication challenge.

Figure 3:
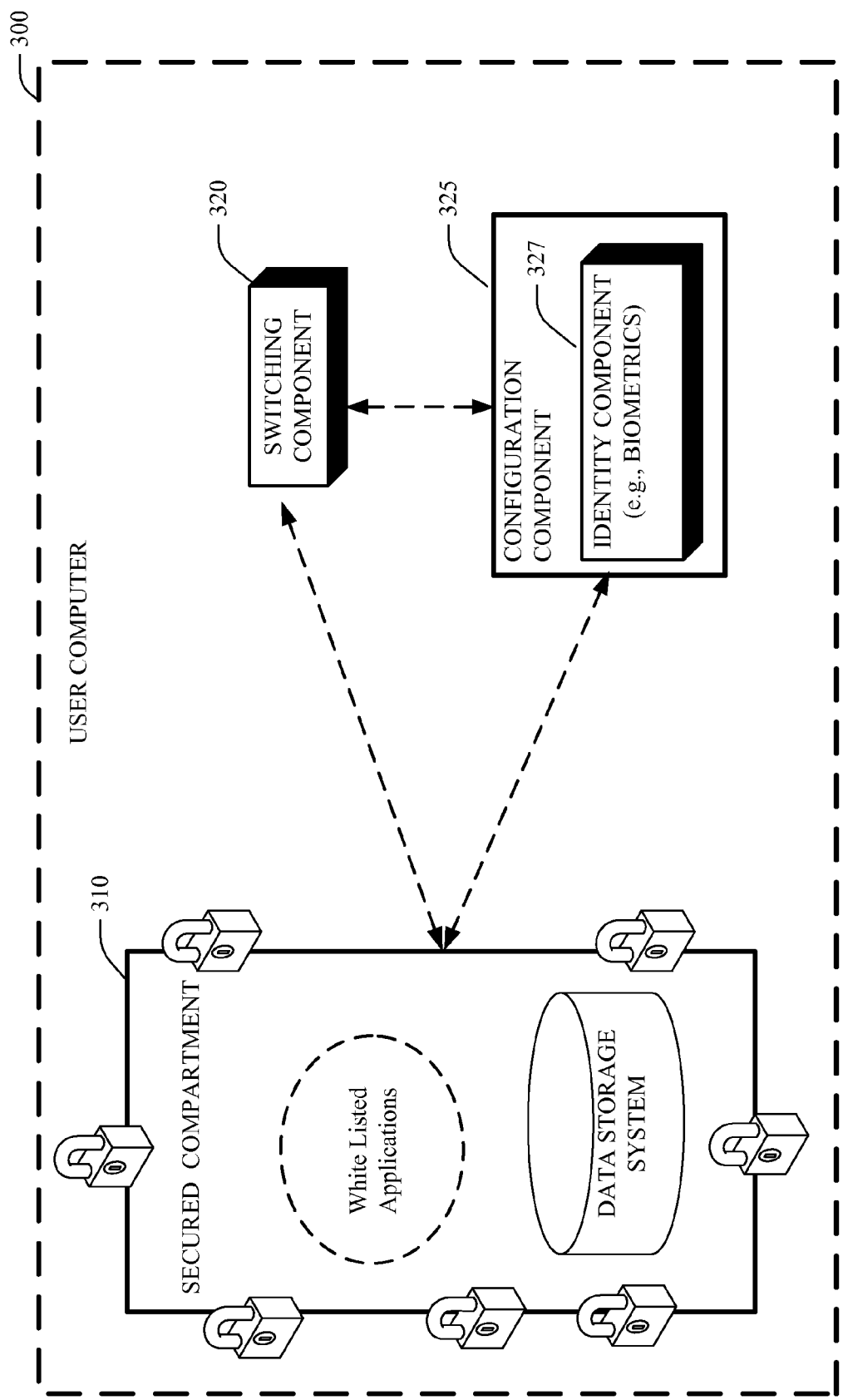
FIG. 3 illustrates a configuration component that can configure/retrieve settings according to an aspect of the subject innovation.

FIG. 3 illustrates a configuration component 325 that can configure/retrieve settings associated with setting the secured compartment 310 for a user thereof. In addition, the configuration component 325 can apply the settings to the secured compartment 310. For example, the configuration component 325 can be operatively connected to an identity component 327. Thus, once the identity component 327 determines the identity of the authorized user, the configuration component 325 can access a data store (not shown) to retrieve the settings associated with such user and automatically configure the secured compartment 310 in accordance with such settings. Accordingly, the configuration component 310 can apply settings that affect a physical configuration of the secured compartment 310 or host machine (e.g., format of data display) as well as a data set employed by the host machine. Moreover, the configuration component 325 can further enable other applications (e.g., calendaring and alert system for tasks) associated with the secured compartment 310.

It is to be further appreciated that the identity component 327 can include an input component (not shown) that is configured to receive the verifiable identification input. For example, the input component can be reader, scanner, detector, sensor, or some other suitable component that can obtain a biometric from the user. Such input component can be specifically tailored for the computer that includes the secured compartment 310; such that a particular type of biometric can be readily obtained. For example, if a machine that includes the secured compartment 310 is a handheld electronic device, such machine can be particularly well suited to readily obtain biometrics related to a user's hands, e.g., fingerprint, hand geometry, grip configuration, and the like, for example).

Figure 4:
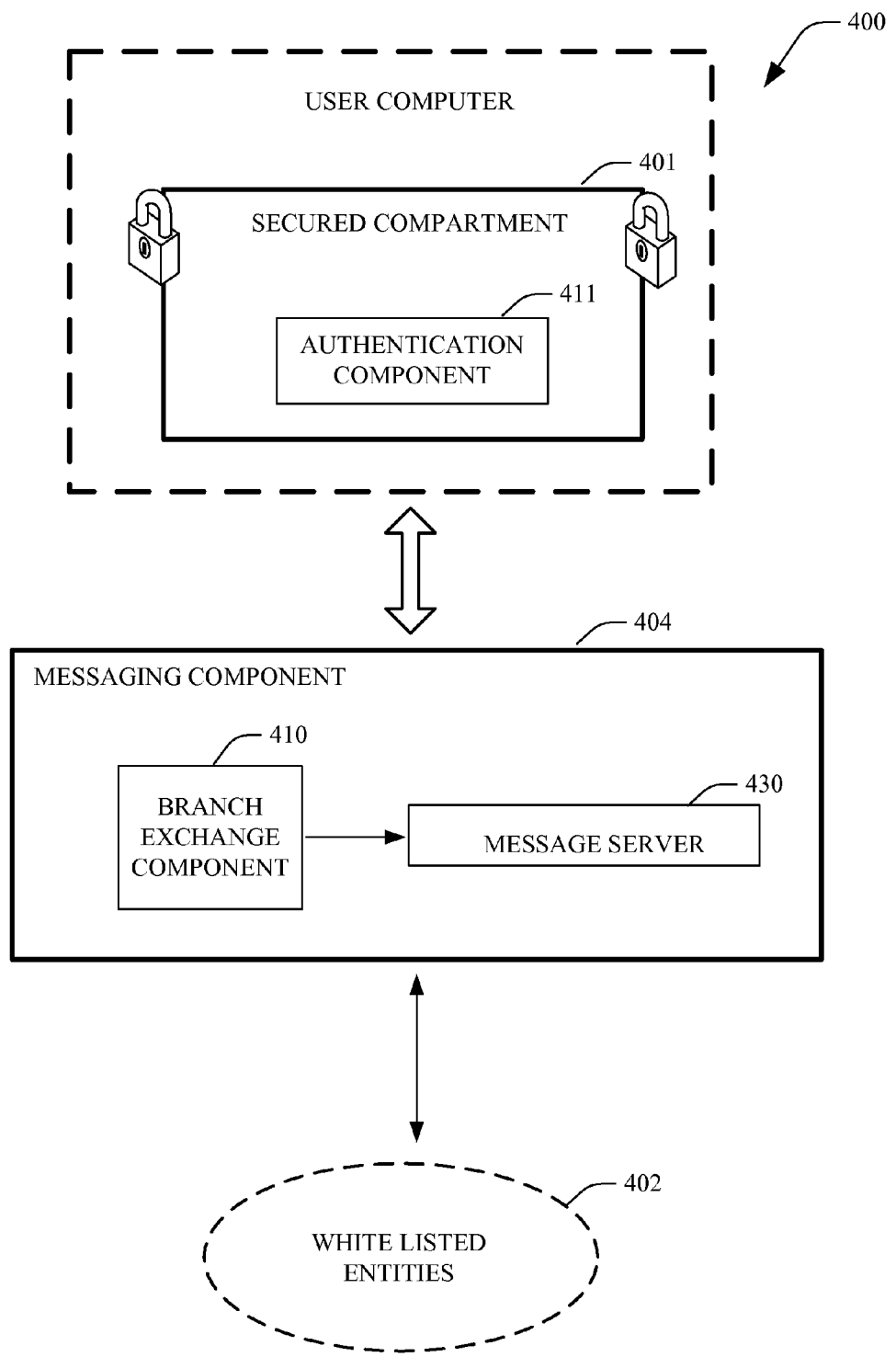
FIG. 4 illustrates a messaging component according to a further aspect of the subject innovation.

FIG. 4 illustrates a system 400 in accordance with an aspect of the subject innovation, which further includes an authentication component 411. Such authentication component 411 can authenticate whether e-mails received from the messaging component 404 are in fact from whitelisted entities—hence guarding all channels into and out of the secured compartment 401. The messaging component 404 can be positioned outside the secured compartment 401, and can further interact with the whitelisted entities 402, to notify users regarding a message in the secured compartment 401. For example, the system 400 can include a branch exchange component 410 that acquires communications, and can include an Intranet protocol (IP) branch exchange (IPBX). Furthermore, the branch exchange component 410 can be public (e.g., central office exchange service) or private (PBX). Accordingly, the branch exchange component 410 can receive communications from conventional telephone systems or over the Internet, among others, via a telephone protocol, IP protocol (e.g., H.323, SIP . . . ) or any other public or proprietary protocol.

As illustrated, the system 400 can supply a notification to a user that messages from whitelisted entities are present in the secured compartment 401. In a related aspect, the voice or facsimile message communicated by the whitelisted entity can be also be recorded or saved and provided as an attachment to the e-mail generated by the system 400. Furthermore, a portion of the content of the message can be encoded in the body, for instance in a MIME (Multipurpose Internet Mail Extension) format. Additional information can also be captured in the body such as message type (e.g. voice, fax), calling telephone number, voice message duration, voice message sender name, attachment name, fax number of pages and the like.

The message server 430 can process messages for delivery to an intended recipient mailbox(es), among other things, such that they can be received or retrieved by an email application (e.g., viewer/editor and POP or IMAP client). For example, the server 430 can correspond to a mailbox, SMTP and/or a bridgehead server. Accordingly, the messaging component 404 can forward messages to a recipient's mailbox or mailboxes located inside the secured compartment 401, via the authentication component 411 that verifies whether a message from a whitelisted entity awaits a user—in the secured compartment 401.

Figure 5:
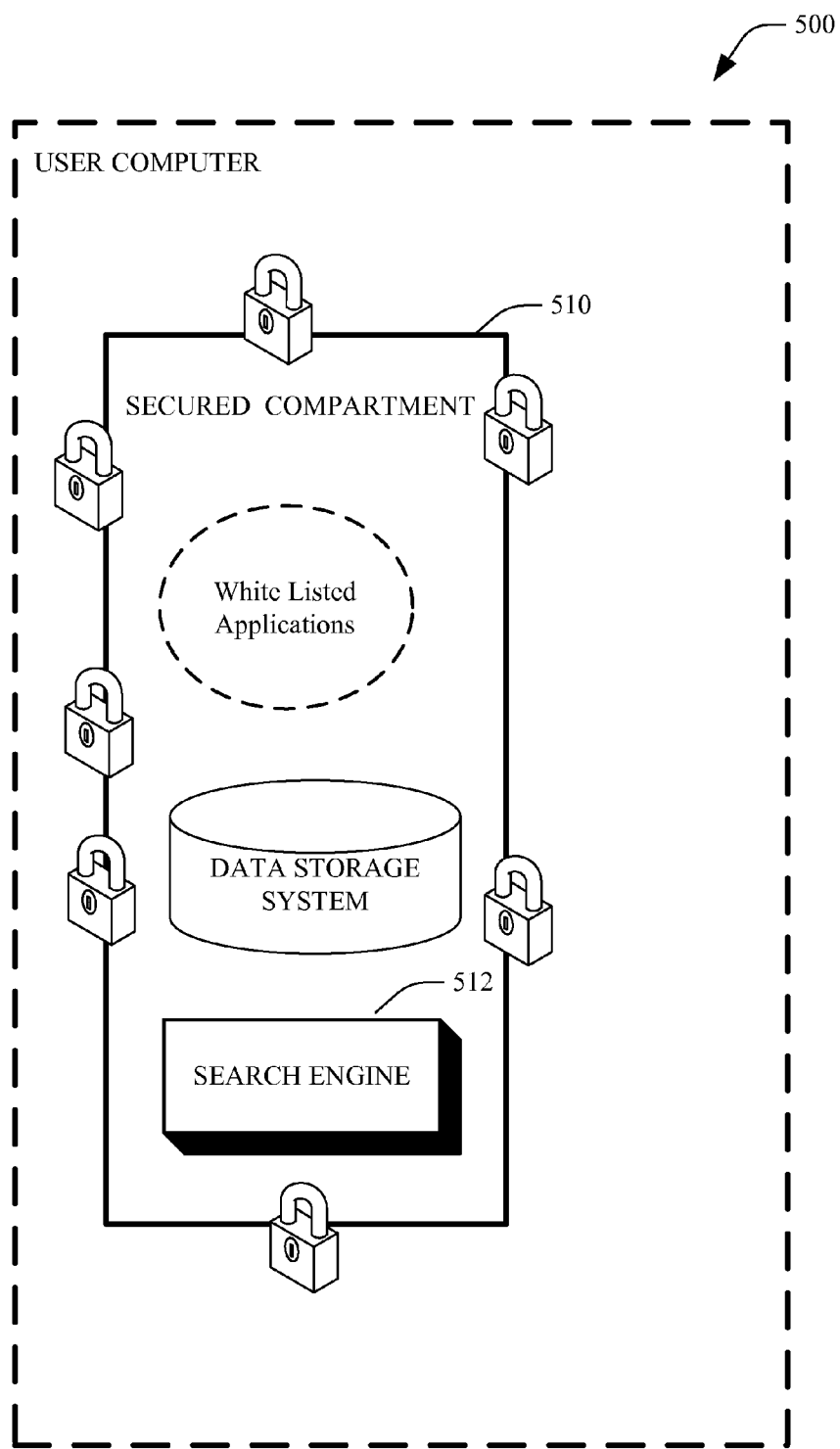
FIG. 5 illustrates a search engine as part of a secured compartment according to a further aspect of the subject innovation.

FIG. 5 illustrates a system 500 that further includes a search engine 512 as part of the secured compartment 510. Such search engine 512 receives and executes queries on behalf of a user with the whitelisted domains. Results of the query are received and analyzed by an analysis component (not shown) that filters/organizes results as a function of relevancy of such data to the user and associated context of query. Moreover, the analysis component can further assist with reformulating search queries, or generating supplemental queries as a function of determined or inferred intent of the user, or relevancy of search results.

In addition, a user interface component (not shown) can display data from whitelisted domains once they have been deemed "known safe" for display to the user (e.g., filtering mechanism, and the like.) For example, such user interface component can dynamically modify display settings as a function of content and type of information displayed, user state, user preferences, explicit or implicit learning, user intent such as portals, pop-up windows, queries, statements, utterances, inferences, extrinsic evidence, historical data, machine learning systems, and the like. Actions performed in the secured compartment cannot typically be observed by applications that are running outside the secured compartment.

Additionally, the search engine 512 can execute multiple queries with the whitelisted domains/applications as a function of feedback relating to relevancy of results and user satisfaction. Typically, all channels into and out of the secured compartment 510 can be guarded and the whitelisted applications can run therein, and only whitelisted domains can be visited by browsers associated therewith.

Figure 6:
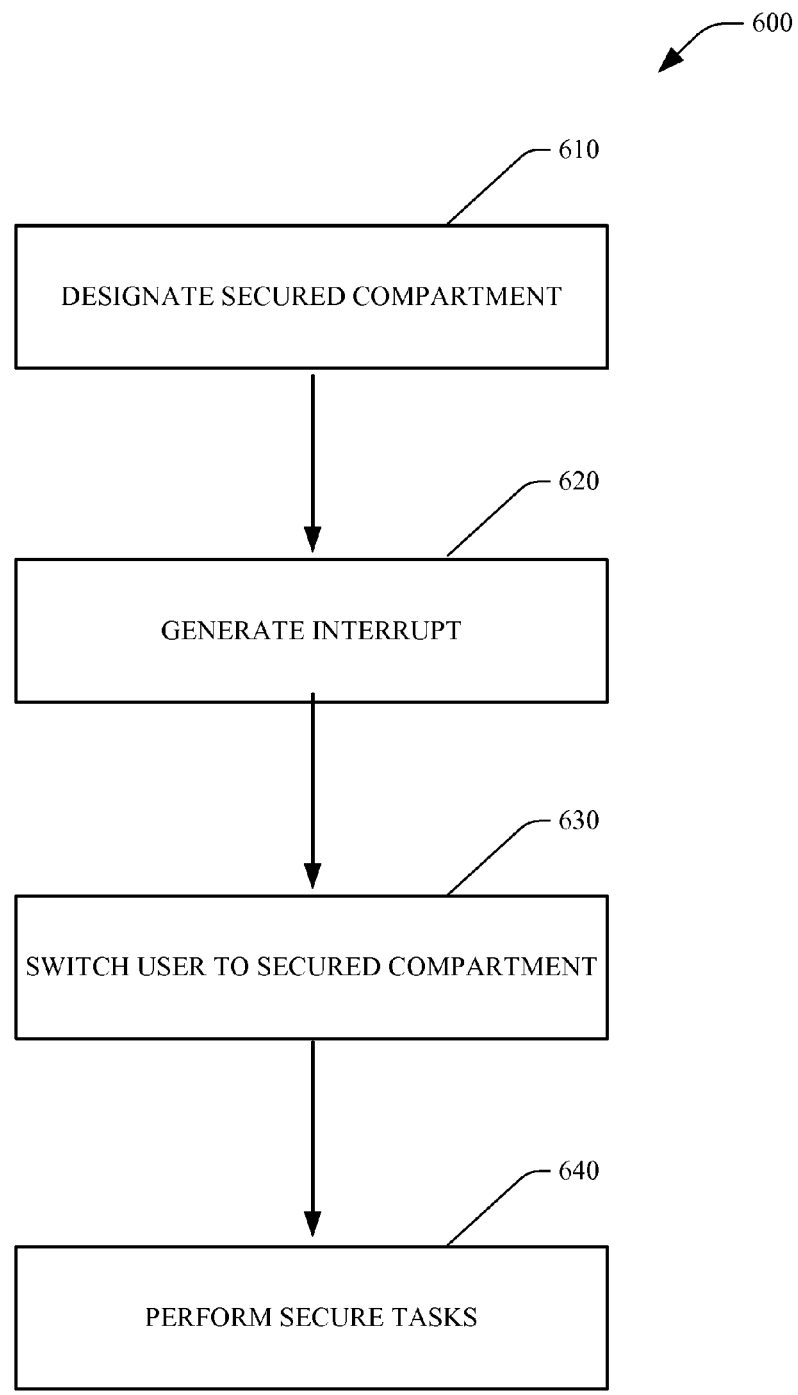
FIG. 6 illustrates a related methodology of designating a secured compartment according to an exemplary aspect of the subject innovation.

FIG. 6 illustrates a related methodology 600 of designating a secure compartment according to an exemplary aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Initially and at 610 a secured compartment can be designated that can represent a set of user experiences that are secured and separate from the remainder of such experiences in the user computer—wherein actions performed in the secured compartment cannot typically be observed by applications that are running outside the secured compartment. Subsequently, and at 620 an interrupt is generated that requests transfer of the user to the secured compartment. Next and at 630, the user is switched to such secured compartment, wherein "whitelisted" entities (e.g., known safe) are presented within the secured compartment. At 640, the user can perform secure tasks with such whitelisted applications, wherein the user can securely interact with sensitive information without concern that such information can be compromised via malicious code or human activity.

Figure 7:
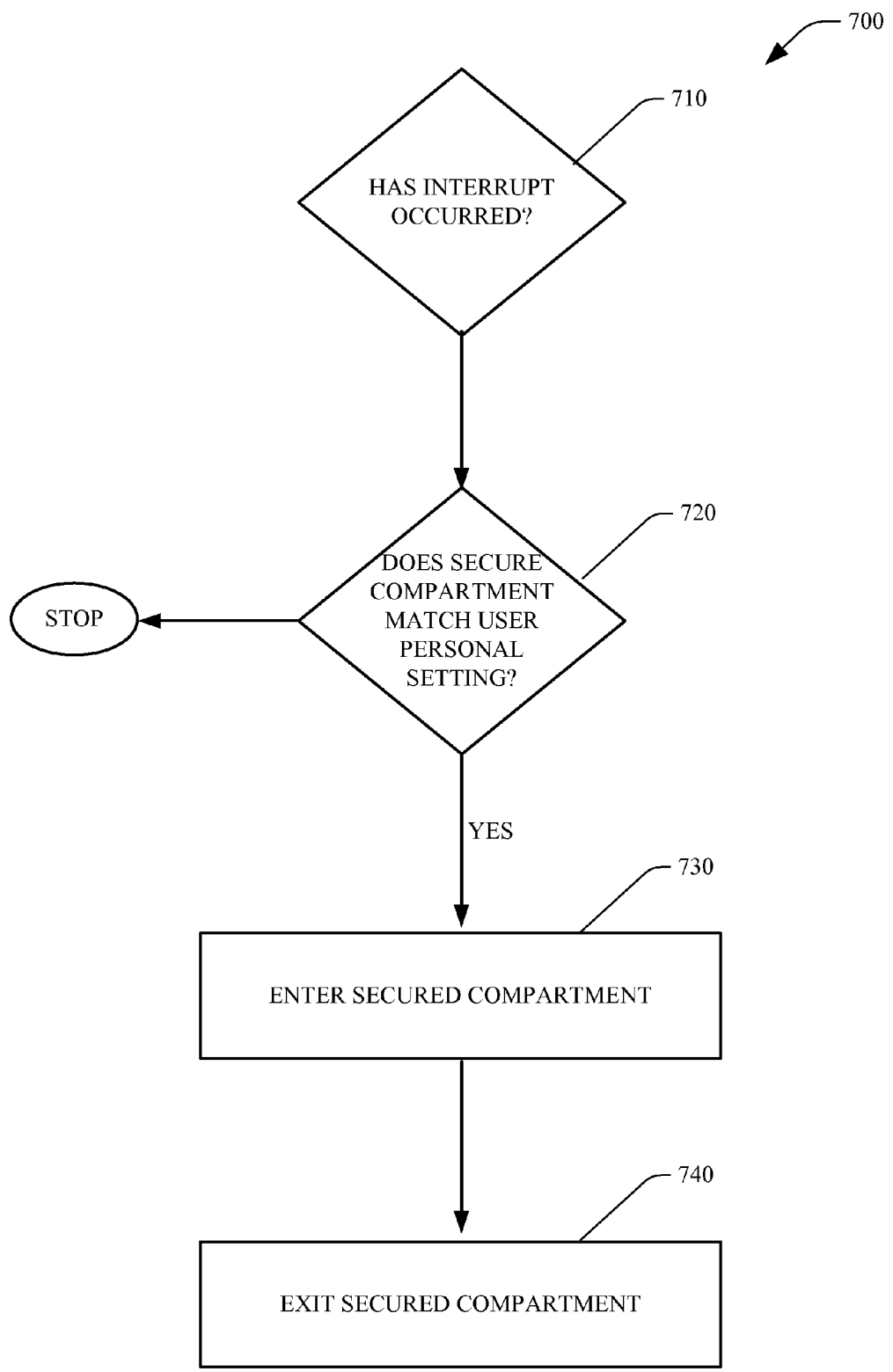
FIG. 7 illustrates a related methodology of switching a user to a secured compartment according to a further aspect of the subject innovation.

FIG. 7 illustrates a related methodology 700 of switching a user to a secured compartment according to a further aspect of the subject innovation. Initially and at 710, a determination is made to verify whether an interrupt has occurred such as related to: an explicit request (e.g., a secure attention sequence); an implicit request (e.g., inference of user activities); and presence of a peripheral device that is bound to the secured compartment (e.g., a USB). Next and at 720, the user can verify the secured compartment matches personal settings previously determined by user, which can include a design that is personalized to the user, to further mitigate a risk for the user being presented with fake representations. If so, and at 730, the user can enter the secured compartment to interact with whitelisted applications, and if such user desires to access non-whitelisted applications/domains, can be forced to exit from the secured compartment at 740. As such, a user's experience within the secured compartment can be separated form outside such compartment.

Figure 8:
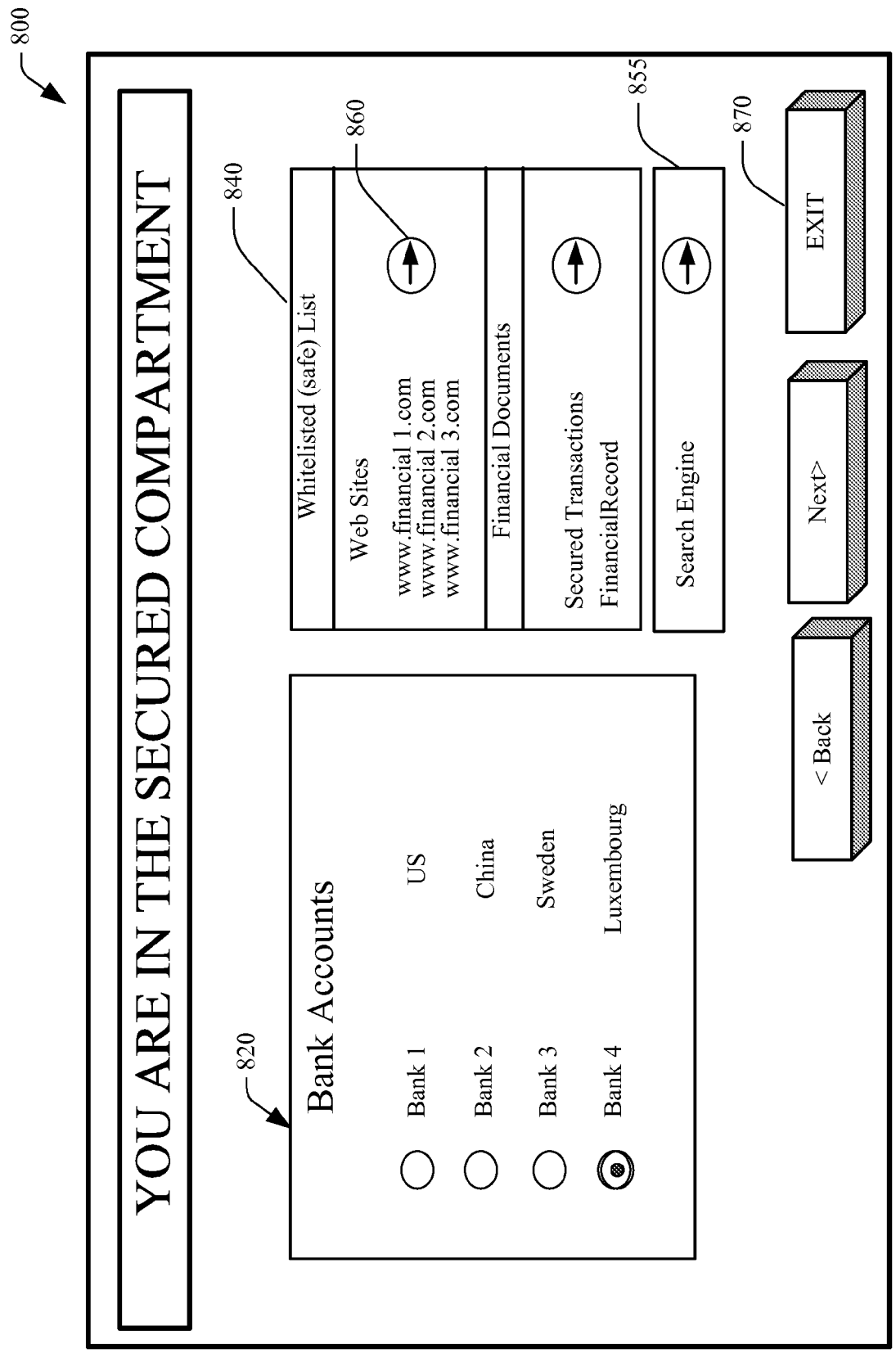
FIG. 8 illustrates an exemplary user interface that facilitates interaction of a user with a secured compartment according to an aspect.

FIG. 8 illustrates an exemplary graphical user interface 800 that facilitates interaction of a user with the secured compartment according to a further aspect. Such graphical interface 800 displays whitelisted applications 840 and can further include personalized data by the user. By clicking/hovering a pointing device such as a mouse over area 860, a user can further expand whitelisted domain names for access thereto. The exemplary user interface (GUI) 800 of the subject invention can further be employed to facilitate account access/generation 820 and creation for an isolated environment that interacts with whitelisted entities, wherein an entity can refer to any active item that a user is capable of interacting with, including but not limited to URIs, programs and data that the user can receive on a channel into the compartment. Moreover, interaction with a search engine can be provided through the dialog box 855, wherein such search engine operates within the secured compartment 800 and further interacts with known safe with whitelisted applications. As illustrated in FIG. 8, clicking box 870 enables the user to exit the secured compartment.

As used herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
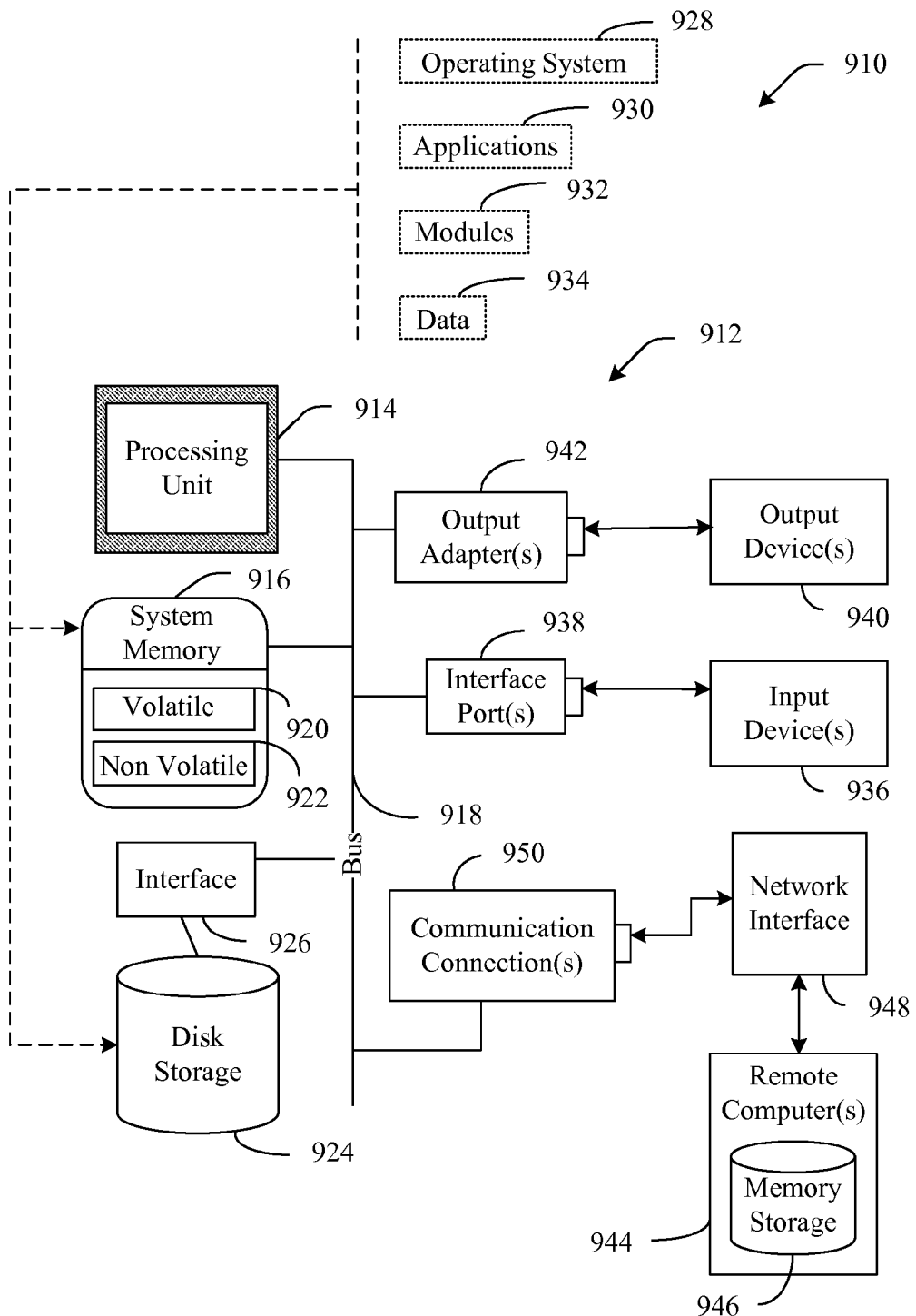
FIG. 9 is a schematic block diagram of a sample-computing environment that can be employed as part establishing a secured compartment in accordance with an aspect of the subject innovation.
Figure 10:
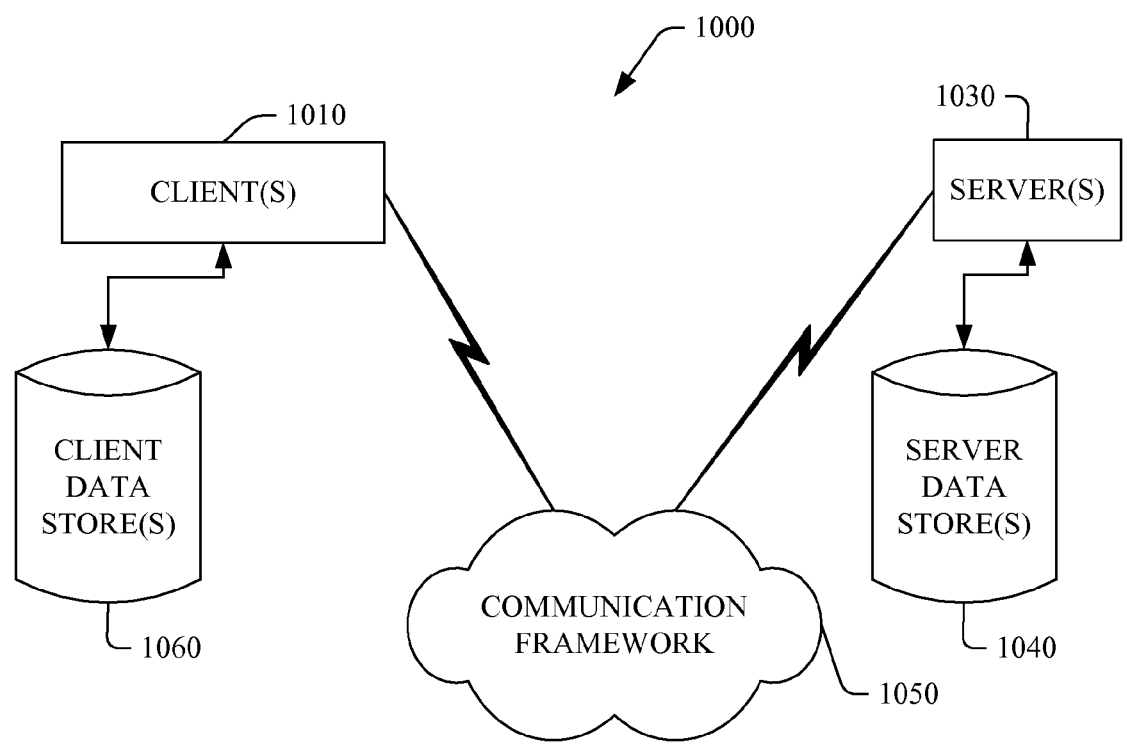
FIG. 10 illustrates an exemplary environment for implementing various aspects of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s)

938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed as part of secured compartment in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising the following:
   one or more computer-readable storage devices storing one or more components; and
   one or more processing units operably coupled to the one or more computer-readable storage devices, the one or more processing units adapted to implement the one or more components, the one or more components comprising:
   an operating system component to handle a plurality of interrupts via a trusted path; and
   a switching component to, in response to a Trusted Computing Base (TCB) generated interrupt:
   switch user interactions to a secured compartment of the one or more computer-readable storage devices, the secured compartment comprising a plurality of whitelisted applications and whitelisted network domains that are accessible only from within the secured compartment, wherein:
   the TCB generated interrupt is captured in a kernel of an operating system stored in the one or more computer-readable storage devices and handled by the operating system component; and
   the computer implemented system handles the user interactions within the secured compartment in a different manner than user interactions outside thereof; and
   prohibit user interaction within the secured compartment with an application or domain that is not one of the plurality of whitelisted applications or the whitelisted network domains.

2. The computer implemented system of claim 1, the TCB interrupt resulting from a secure attention sequence, wherein the secure attention sequence is generated by an application running completely from within the secured compartment.

3. The computer implemented system of claim 1 further comprising an authentication component to authenticate received e-mails prior to allowing access to the emails within the secured compartment.

4. The computer implemented system of claim 1 further comprising a user interface present the secured compartment to a user, the user interface being modifiable based at least in part on personalized settings previously configured by the user.

5. The computer implemented system of claim 4, wherein the personalized settings previously configured by the user are based at least in part on one or more of the user's bank accounts, one or more of the user's financial documents, a search engine, a whitelisted list, or a combination thereof.

6. The computer implemented system of claim 1, wherein the one or more components further comprise a configuration component to:
modify settings affecting at least one of a physical configuration or a data set; and
activate applications associated with the secured compartment.

7. The computer implemented system of claim 6, wherein the configuration component modifies security configurations associated with the secured compartment.

8. The computer implemented system of claim 7, wherein the one or more components further comprise an identity component to modify the security configurations responsive to receiving verifiable identification input representing a biometric of a user.

9. A method comprising:
generating, by one or more processors, a Trusted Computing Base (TCB) interrupt;
capturing the TCB interrupt in a kernel of an operating system;
handling the TCB interrupt with an operating system component;
switching a user account to a secured compartment having one or more whitelisted applications and whitelisted network domains that are accessible only from within the secured compartment, the switching based on the captured TCB interrupt;
presenting personalized user settings previously configured by a user of the user account to allow the user to verify that the secured compartment complies with the personalized user settings, wherein personalized user settings are based at least in part on a history of user actions that have previously occurred within the secured compartment, the history of user actions comprising at least one of receiving one or more messages within the secured compartment or interacting with one or more applications installed inside the secured compartment; and
prohibiting user interaction within the secured compartment with an application or domain that is not one of the one or more whitelisted applications or whitelisted network domains.

10. The method of claim 9, the TCB interrupt being generated upon a detected connection of a peripheral device to the computing device, upon an inference made based on one or more user activities, or upon a combination thereof.

11. The method of claim 9 further comprising notifying the user regarding messages identified within the secured compartment.

12. The method of claim 9 further comprising providing a search engine as part of the secured compartment.

13. The method of claim 9, wherein the TCB interrupt is generated based at least in part on a secure attention sequence.

14. The method of claim 10 further comprising implementing certificates for credential verification between the peripheral device and the computing device.

15. The method of claim 9 further comprising implementing a user authentication verification before switching the user account to the secured compartment.

16. The method of claim 9 further comprising automatically switching the user account out of the secured compartment in response to a user request to access at least one resource within the secured compartment that is not one of the plurality of whitelisted applications or whitelisted network domains.

17. The method of claim 9 further comprising binding an object to the secured compartment via an authenticator generated therein.

18. The method of claim 12 further comprising, receiving and executing, with the search engine, only queries associated with the one or more whitelisted network domains.

19. One or more computer-readable storage devices having computer-readable instructions stored thereon which, when executed by one or more processors, cause a computing device to perform acts comprising:
generating a Trusted Computing Base (TCB) interrupt in response to a secure attention sequence, wherein the secure attention sequence comprises a predetermined input;
capturing the TCB interrupt in a kernel of an operating system;
handling the TCB interrupt with an operating system component, the operating system component utilizing a trusted path;
accessing a secured compartment based on the TCB interrupt;
based at least in part on accessing the secured compartment, presenting a plurality of whitelisted applications and whitelisted domains within the secured compartment, the plurality of whitelisted applications and whitelisted domains being accessible only from within the secured compartment; and
based at least in part on receiving a request to access an application or domain that is not one of the plurality of whitelisted applications or whitelisted domains, prohibiting access to the secured compartment.

\* \* \* \* \*